United States Patent [19]

Smith et al.

[11] 4,252,028

[45] Feb. 24, 1981

[54] METHOD AND APPARATUS FOR MEASURING FLOW

[75] Inventors: James E. Smith; A. J. Mims, both of Boulder; Michael D. Anfinson, Longmont, all of Colo.

[73] Assignee: S & F Associates, Boulder, Colo.

[21] Appl. No.: 15,031

[22] Filed: Feb. 26, 1979

[51] Int. Cl.³ .............................................. G01F 1/84
[52] U.S. Cl. .................................................. 73/861.38
[58] Field of Search ............... 73/32 A, 194 B, 194 M

[56] References Cited

U.S. PATENT DOCUMENTS

| | | | |
|---|---|---|---|
| 2,821,084 | 1/1958 | Altfillisch et al. ...................... | 73/194 |
| 2,877,649 | 3/1959 | Powers ................................... | 73/194 |
| 3,396,579 | 8/1968 | Souriau .................................. | 73/194 |
| 3,485,098 | 12/1969 | Sipin ....................................... | 73/194 |
| 3,927,569 | 12/1975 | Pavlin et al. ............................ | 73/194 |
| 4,127,028 | 11/1978 | Cox ........................................ | 73/194 |

*Primary Examiner*—Herbert Goldstein
*Attorney, Agent, or Firm*—O'Rourke & Harris

[57] ABSTRACT

Method and apparatus for measuring mass flow, and particularly the sum or difference in mass flow of distinct streams of flowing materials, wherein a plurality of channels are provided in one or more conduits rotating or oscillating as a common unit with additive streams or a common stream being flowed through the channels in a first direction and subtractive streams being flowed through the channels in an opposite direction, and in which the net Coriolis force imposed upon the conduit unit is measured.

22 Claims, 8 Drawing Figures

METHOD AND APPARATUS FOR MEASURING FLOW

BACKGROUND OF THE INVENTION

1. Field of the Invention

The present invention relates generally to flow measuring devices, and more particularly to flow measuring devices in which a plurality of channels are defined in a common rotating or oscillating conduit unit with flow through certain of the channels in a given direction being additive and flow in other of the channels in the opposite direction being subtractive. Also, enhanced flow measurement of a single stream of loose or aerated material is provided by flowing such streams through multiple flow channels rather than a single, larger flow channel.

2. Description of Related Art

Flow meters of the general type with which the present invention is concerned have been known as gyroscopic mass flow meters, or Coriolis force mass flow meters. In essence, the function of both types of flow meters is based upon the same principal. Viewed in a simplified manner, Coriolis forces involve the radial movement of mass from a first point on a rotating body to a second point. As a result of such movement, the peripheral velocity of the mass changes, i.e., the mass is accelerated. The acceleration of the mass generates a force in the plane of rotation and perpendicular to the instantaneous radial movement. Such forces are responsible for precession in gyroscopes.

A great number of approaches have been taken in utilizing Coriolis forces to measure mass flow. For instance, the Roth U.S. Pat. Nos. 2,865,201, 3,276,257, and 3,312,512 disclose gyroscopic flow meters employing a full loop which is continuously rotated (DC type), or oscillated (AC type).

Another flow meter utilizing substantially the same forces but avoiding reversal of flow by utilizing a less than 180° "loop" is described in Sipin U.S. Pat. No. 3,485,098. The device is of the so called AC type, i.e., the conduit oscillates around an axis and fluid flowing through the conduit flows first away from the center of rotation and then towards the center of rotation thus generating Coriolis forces as a function of the fluid mass flow rate through the loop.

Since there is but one means of generating Coriolis forces, all of the prior devices of the gyroscopic and Coriolis force configurations generate the same force, but specify various means for measuring such forces. The instant invention is applicable to any Coriolis flow meter.

A device similar in appearance to the preferred embodiment of the instant invention but operable to measure a single flow or stream is disclosed in U.S. Pat. No. 4,127,028 issued Nov. 28, 1978, to Cox et. al. In this patented structure, a pair of "U" shaped tubes having narrowed base portions and defining but a single flow channel are oscillated out of phase with one another to provide exaggerated distortions as a result of the Coriolis forces produced from flow. Again, whatever the merits or disadvantages of the structure disclosed in the patent, the instant invention could be adapted to such structure.

Another approach to the problem of measuring the small Coriolis forces is described in U.S. Pat. No. 4,109,524, for "Method and Apparatus for Mass Flow Measurement", issued Aug. 29, 1978, to J. Smith.

A particularly advantageous flow meter structure is disclosed in pending U.S. Patent Application Ser. No. 926,468 filed July 20, 1978, by J. Smith, for "Method and Structure for Flow Measurement" now U.S. Pat. No. 4,187,721. In the disclosed device, flow is advantageously determined by oscillating a "U" shaped tube similar to that disclosed in U.S. Pat. No. 4,127,028, and determining flow rates as a function of distortion of the tube around a central axis, or as a function of restoring forces generated to null distortion of the tube. In any event, the invention of the instant application will be described with reference to a Coriolis flow meter substantially as described in the pending patent application.

SUMMARY OF THE INVENTION

The present invention, which provides a function heretofore unavailable in previous mass flow measuring devices, comprises a substantially unitary rotating or oscillating conduit member, i.e., the AC or DC arrangement of the prior art, in which a plurality of flow channels are defined. Oscillating or rotating means are provided to induce rotational movement of the channels, and means are provided to measure net Coriolis force in the conduit unit, utilizing any Coriolis mass flow meter arrangement. Either a common stream or distinct streams of materials are flowed through the channels of the conduit with additive streams being flowed through the channels in one direction, and subtractive streams being flowed through the channels in the opposite direction. Net Coriolis force is then measured in the conduit unit.

While defining the various channels in a single conduit unit is an operable embodiment of the invention, for many purposes distinct but operably linked individual conduits are preferred to function as a single conduit unit having multiple channels. In such a distinct conduit unit, flow streams may be physically isolated thereby avoiding undesirable heat flow between streams at different temperatures.

An important advantage of the present invention is the provision for flowing distinct streams of material through the device in an additive or subtractive manner.

Another advantage of the present invention is the improved accuracy and sensitivity resulting from the use of a single Coriolis force measuring device to determine the flow of multiple streams of material thereby avoiding the inaccuracies induced by scale factors, drift or other differences between independent mass flow meters employed in parallel or in series.

Yet another advantage of the present invention is the economy afforded by a single instrument capable of measuring multiple flow streams.

Still another advantage of the present invention is the enhanced accuracy of an apparatus having multiple flow channels when measuring loose, aerated or other compressible streams of materials in a flow stream through multiple channels.

DETAILED DESCRIPTION OF THE INVENTION

Figure 1:
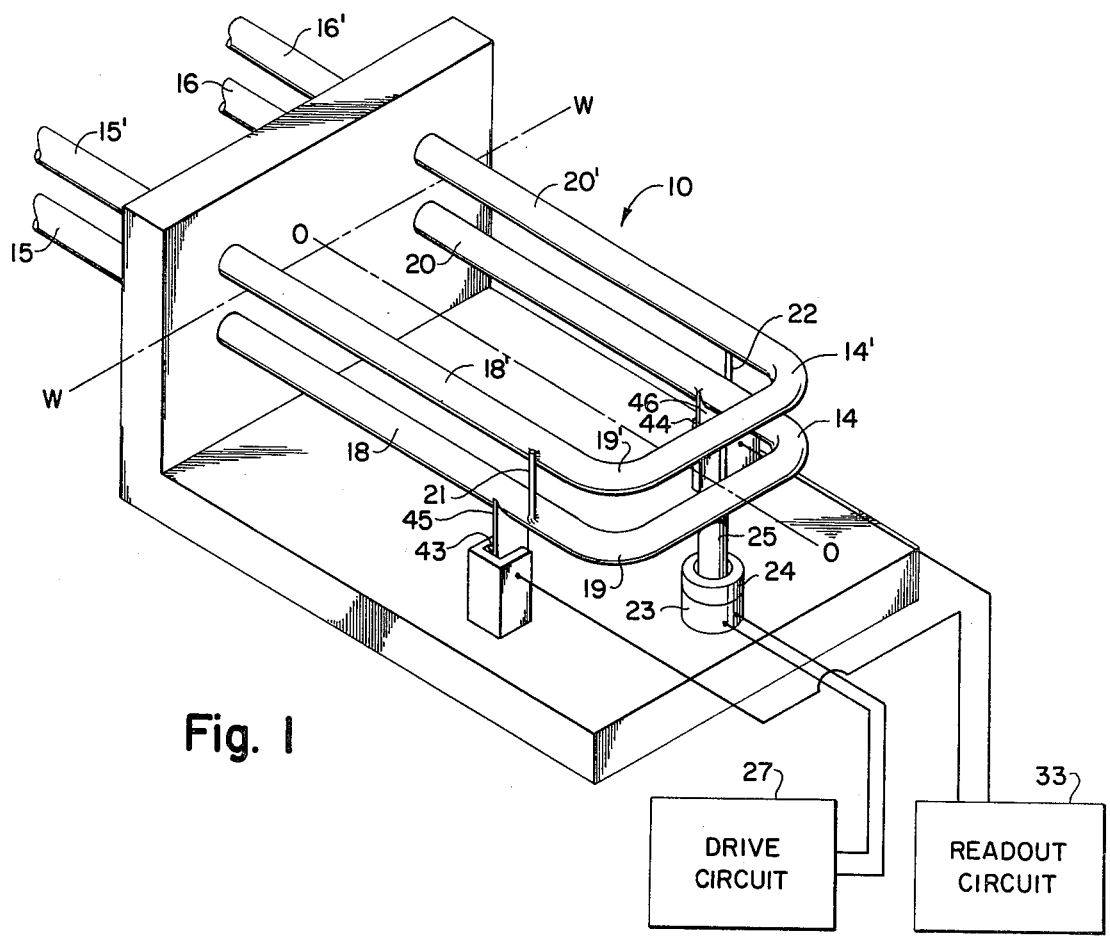
FIG. 1 is a perspective view of a flow meter according to one embodiment of the present invention.

Turning now to the drawings, wherein like components are designated by like reference numerals throughout the various figures, a flow meter device according to a first, preferred embodiment of the invention is illustrated in FIG. 1 and generally designated by reference numeral 10. Flow meter 10 includes fix support 12 having "U" shaped conduits 14 and 14' mounted thereto in a cantilevered, beamlike fashion. Substantially identical "U" shaped conduits 14 and 14' are preferably of a tubular material having resiliency as is normally found in such materials as beryllium, copper, tempered aluminum, steel, plastics, etc. Though described as "U" shaped, conduits 14 and 14' may have legs which converge, diverge, or which are skewed substantially. A continuous curve is also contemplated. Preferably, each "U" shaped conduit 14 and 14' includes nominal inlets 15 and 15' and outlets 16 and 16' which in turn are connected by inlet legs 18 and 18', base legs 19 and 19' and outlet legs 20 and 20', as illustrated. Most preferably, inlet legs 18 or 18', and outlet legs 20 or 20' of a given conduit 14 or 14' are parallel, and, similarly, base legs 19 or 19' of a given conduit 14 or 14' are perpendicular thereto; but, as mentioned above, substantial deviations from the ideal configuration, i.e., five percent convergence or divergence do not appreciably compromise results. Operable results may be obtained even with gross deviations on the order of thirty or forty percent, but, since little is to be gained from such deviations in the embodiment of concern, it is generally preferred to maintain the inlet legs 18 or 18' and the outlet legs 20 or 20' in a substantially parallel relationship. Conduits 14 and 14' may be in the form of a continuous or partial curve as is convenient. However, in most instances, conduits 14 and 14' are of identical or similar configurations.

Conduits 14 and 14' are connected to form a single unit for purposes of oscillation by connectors 21 and 22 secured therebetween which as illustrated may be wire linked. Conduits 14 and 14' are somewhat distorted to provide pretension in connectors 21 and 22 such that the pretension of connectors 21 and 22 will be greater than the magnitude of the ordinary Coriolis forces generated in conduits 14 and 14'. Thus conduits 14 and 14', are free to oscillate around axis W—W as a result of appropriate compliance in connectors 21 and 22, which may conveniently be formed of, for instance, piano wire. However, as a result of the pretension of connectors 21 and 22 of conduits 14 and 14', oscillation around axis O—O only as a unit with individual Coriolis forces generated in either of conduits 14 or 14' either adding or subtracting as the case may be. Though the illustrated embodiment is a preferred arrangement, other arrangements are of course possible provided that conduits 14 and 14' are not formed into a structural member resisting oscillation around either of the axis W—W or O—O, and providing that unitary oscillation and distortion occur around such axis.

It is to be understood that the following discussion is primarily concerned with the preferred embodiment which involves preferred means for accomplishing essentially conventional functions of Coriolis mass flow meters. Thus, while the novelty of the instant invention is predicated essentially upon the use of multiple channels such as conduits 14 and 14', and that such use of multiple channels is advantageous to applicable mass flow meter technology in general, the following discussion is addressed to preferred means for accomplishing mass flow measurement.

Force coil 24 and sensor coil 23 are mounted to base 12, and received magnet 25 therein. Magnet 25 is carried by base leg 19. Drive circuit 27, which will be discussed in more detail below, is provided to generate an amplified force in response to sensor coil 23 to drive "U" shaped conduit 14, and accordingly attached "U" shaped conduit 14', at the unit natural frequency around axis W—W in an oscillating manner. Though "U" shaped conduits 14 and 14' are mounted in a beamlike fashion to support 12, the fact that the conduits are oscillated at their resonant frequency permits appreciable amplitude to be obtained. "U" shaped conduits 14 and 14' essentially pivot around axis W—W.

First sensor 43 and second sensor 44 are supported adjacent the intersections of base leg 19 and inlet leg 18, and base leg 19 and outlet leg 20, respectively. It is to be understood that while the following discussion is directed primarily to conduit 14 which carries the measuring and oscillating drive means, conduit 14 is of course operably connected to conduit 14' as described above. Sensors 43 and 44, which are preferably optical sensors, but generally may be proximity or center crossing sensors, are activated as "U" shaped conduit 14 passes through a nominal reference plane at approximately the midpoint of the "beam" oscillation. Readout circuit 33, which will be described in more detail below, is provided to indicate mass flow measurement as a function of the time differential of signals generated by sensors 43 and 44.

Figure 2:
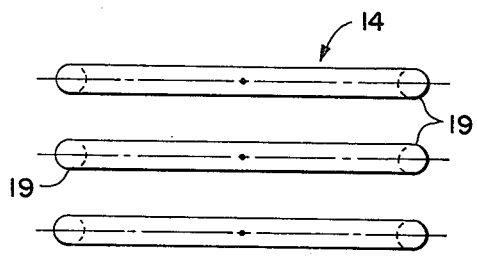
FIG. 2 is an end view of a simplified illustration of the flow meter of FIG. 1 showing oscillation at the midpoint and at the extremes of movement of the conduit member.
Figure 4:
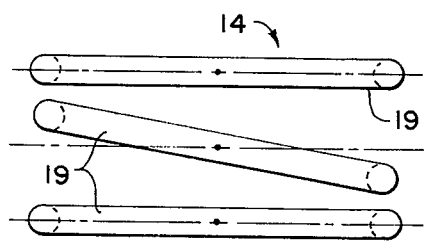
FIG. 4 is an end view similar to that illustrated in FIG. 2 but illustrating the midpoint oscillation in the down direction under flow conditions.
Figure 3:
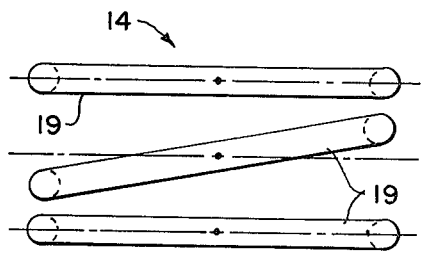
FIG. 3 is an end view similar to that illustrated in FIG. 2 but illustrating the midpoint oscillation in the up direction under flow conditions.

Operation of flow meter 10 will be more readily understood with reference to FIGS. 2, 3 and 4, which, in a simplified manner, illustrate the basic principle of the instant invention. When conduit 14, and accordingly attached conduit 14' (not shown in the subject FIGURE), are oscillated in a no flow condition in both conduits, inlet leg 18 and outlet leg 20 bend substantially around axis W—W essentially in a pure beam mode, i.e., without torsion. Accordingly, as shown in FIG. 2, base leg 19 maintains a constant angular position around axis O—O throughout oscillation. However, when a net flow is initiated, fluid moving through conduits 14 and 14' produce a net Coriolis force which will be described below with reference to FIG. 3 as a "positive" net flow, though it is to be understood that a net "negative" flow would be determined in a similar manner with distortion of conduit 14 being in the opposite sense as discussed. Accordingly, as shown in FIG. 3, as base leg 19 passes through the midpoint of oscillation, the net positive Coriolis forces generated by conduits 14 and 14' impose a force couple on "U" shaped conduit 14 thereby rotating base leg 19 angularly around axis O—O. The distortion is of course the result of the sum of the individual Coriolis forces generated in conduit 14 and conduit 14'. Determination of the distortion of base leg 19 relative to the nominal undistorted midpoint plane around axis O—O is preferably measured in terms of the time differential between the instant the leading leg, i.e., the inlet leg in the case of FIG. 3, passes through the midpoint plane and the instant the trailing leg, i.e., the outlet leg in the case of FIG. 3, passes through such plane. Measurement of time differences in such a manner avoids the necessity of maintaining constant frequency and amplitude since variations in amplitude are accompanied by compensating variations in the velocity of base leg 19. Accordingly, by merely driving "U" shaped conduits 14 and 14' at their unit resonant frequency, time measurements may be made in a manner which will be discussed in further detail below, without concern for concurrent regulation of amplitude. However, if measurements are made in but one direction of oscillation, i.e., the up direction of FIG. 3, it would be necessary to maintain an accurate angular alignment of base leg 19 relative to the nominal midpoint plane. Even this requirement may be avoided by, in essence, subtracting the time measurements in the up direction, as shown in FIG. 3, and those in the down direction, as shown in FIG. 4. As is readily recognized by one skilled in the art, movement in the down direction, as in FIG. 4, reverses the direction of the Coriolis force couple and accordingly, as shown in FIG. 4, reverses the direction of distortion as a result of the Coriolis force couple. Similarly, the reversal of flow through conduits 14 and 14' will reverse the direction of distortion of the Coriolis force couple.

In summary, "U" shaped conduits 14 and 14', having specified frequency characteristics though only general physical configuration characteristics, are oscillated as a unit around axis W—W. Flow through "U" shaped conduits 14 and 14' induces spring distortion in the unit comprising "U" shaped conduits 14 and 14' thus causing, as a convenient means of measurement, an angular distortion of base leg 19 around axis O—O initially in a first angular direction during one phase of the oscillation, and, then in the opposite direction during the other phase of oscillation. Though, by controlling amplitude, flow measurements may be made by direct measurement of distortion, i.e., strobe lighting of base leg 19 at the midpoint of oscillation with, for instance, an numerical scale fixed adjacent to end portions and a pointer carried by base leg 19, a preferred mode of measurement involves determining the time difference between the instant in which the leading and trailing edges of base leg 19, as measured at flags 45 or 46, move through the midpoint plane. This avoids the need to control amplitude. Further, by measuring the up oscillation distortions and the down oscillation distortions in the time measurement mode, anomalies resulting from physical misalignment of "U" shaped conduit 14 relative to the midpoint plane are cancelled from the measurement results. In this manner differential measurements of flow may be made by, for purposes of illustration, flowing a stream through "U" shaped conduit 14 in one direction while flowing another stream through "U" shaped conduit 14' in the opposite direction. If the two flows are identical, i.e., no differential flow, the Coriolis forces generated in conduits 14 and 14' will be equal but of opposite sense around axis O—O thus resulting in no distortion of base leg 19. Distortions of base leg 19, with appropriate sense, will result from differences of flow through the conduits 14 and 14'. In a similar manner, multiple conduits may be utilized to define multiple channels of flow for yet additional streams.

Figure 5:
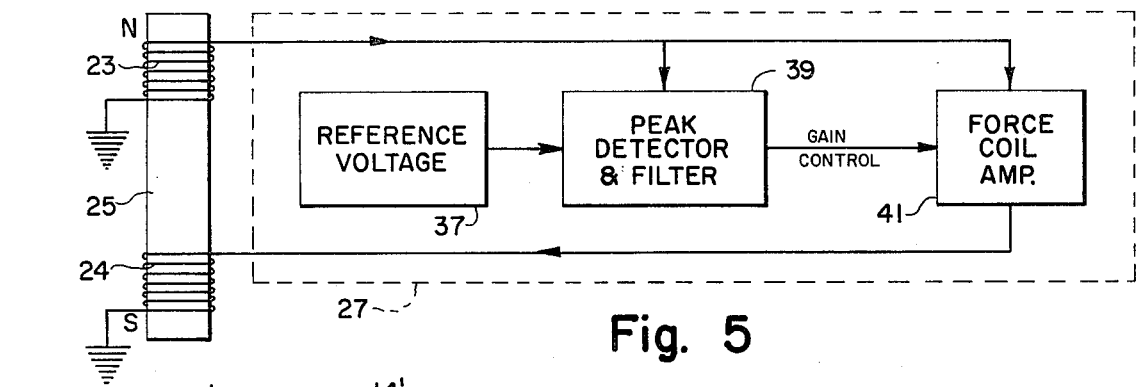
FIG. 5 is a block diagram drawing of the drive circuit of the flow meter in FIG. 1.
Figure 6:
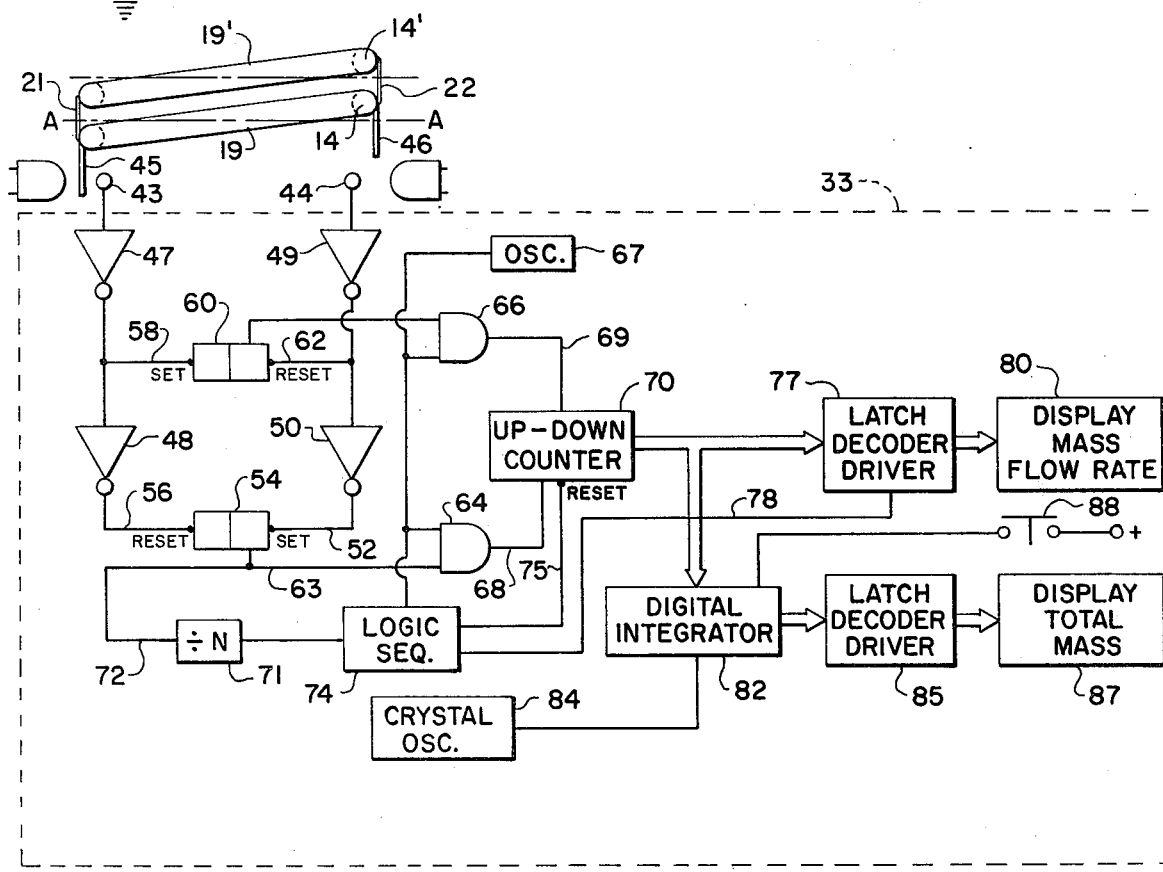
FIG. 6 is a logic diagram of a preferred readout circuit of the flow meter of FIG. 1.

The essentially conventional—given the above discussion of the purposes of the invention—electronic aspects of the invention will be more readily understood with reference to FIGS. 5 and 6. As shown in FIG. 5, drive circuit 27 is a simple means for detecting the signal generated by movement of magnet 25 and sensor coil 23. Detector 39 compares a voltage produced by sensor coil 23 with reference voltage 37. As a result, the gain of force coil amplifier 41 is a function of the velocity of magnet 25 within sensor coil 23. Thus, the amplitude of oscillation of "U" shaped conduits 14 and 14' are readily controlled. Since "U" shaped conduits 14 and 14' are oscillated at their unit resonant frequency, frequency control is not required.

The nature and function of readout circuit 33 will be more readily understood with reference to the logic circuit illustrated in FIG. 6. Readout circuit 33 is connected to inlet side sensor 43 and outlet side sensor 44 which develop signals as flags 45 and 46 which are carried adjacent the intersection of base leg 19 and inlet leg 18 or outlet 20, respectively, pass by the respective sensor at approximately the midpoint of plane A—A during the oscillation of "U" shaped conduit 14. As shown, inlet sensor 43 is connected through inverter amplifier 47 and inverter 48 while the outlet side sensor is similarly connected through inverter amplifier 49 and inverter 50. Line 52, the output from inverter 50, provides, as a result of the double inversion, a positive signal to the set side of flip-flop 54. Similarly, line 56 provides an output from inverter 48, again a positive signal, to the reset side of flip-flop 54. Accordingly, flip-flop 54 will be set upon the output of a positive signal from sensor 44, and reset upon the subsequent output of a positive signal from sensor 43.

In a similar manner, line 58 provides the inverted signal from sensor 43 through inverter amplifier 47 to the set side of flip-flop 60, while line 62 provides the output of inverter amplifier 49 to the reset side of flip-flop 60. Thus, flip-flop 60 would be set upon the output of a negative signal from sensor 43, on reset of the subsequent output of a negative signal from sensor 44. The output of flip-flop 54 is connected through line 53 to a logic gate such as AND gate 64. AND gates 64 and 66 are both connected to the output of oscillator 67 and, accordingly, upon output from flip-flop 54, the signal from oscillator 67 is gated through AND gate 64, to line 68 and thus to the down count side of up-down counter 70. In a similar manner, upon the output of a signal from flip-flop 60, the output of oscillator 67 is gated through AND gate 66 to line 69 connected to the up count side of up-down counter 70.

Thus, in function, readout circuit 33 provides a down count signal at the frequency of oscillator 67 to up-down counter 70 for the period during which sensor 44 is activated prior to activation of sensor 43 during the down motion of "U" shaped conduit 14, while an up count signal is provided to up-down counter 70 for the period during which sensor 43 is activated prior to activation of sensor 44 during the up motion of "U" shaped conduit 14.

As will be apparent from consideration of the relative periods of activation of the flip-flops under "positive"

flow conditions, the down count period of up-down counter 70 is substantially longer than the up count period resulting from activation of flip-flop 60. The resulting increased count in the down count side of up-down counter 70 is an accurate indication of the net flow over a period of oscillation. The count in up-down counter 70 after a given number of oscillations is directly proportional to net mass flow in "U" shaped conduits 14 and 14' during the choosen time period. The number of oscillations may be determined by, for instance, counting the number of activations of, as a typical example, flip-flop 54 at down counter 71 connected to the output of flip-flop 54 by line 72. Thus, upon the occurance of "N" counts from flip-flop 54, down counter 71 is activated and, in turn activates logic sequencer 74. Logic sequencer 74 is connected to oscillator 67, and at the frequency of oscillator 67 first latches latch decoder driver 77 through line 78, and then resets down counter 70 through line 75. Thus, logic sequencer 74 is again activated after "N" counts from flip-flop 54, display 80 indicates the accumulated count of up-down counter 70 at the time of interrogation thereof, and accordingly displays mass flow rate for the period of "N" oscillations.

Total mass flow for a selected reset period is similarly provided in that the output of up-down counter 70 is supplied to digital integrator 82 which is also connected to crystal oscillator 84. Thus the counts from up-down counter 70 are integrated with regard to time, i.e., the fixed stable frequency of oscillator 84 and the integral provided to latch decoder driver 85 which in turn is connected to display 87 to provide a total mass flow readout for the period initiated upon previous activation of reset 88, i.e., a switch connected to digital integrator 82.

In summary, it will be recognized that, in a preferred embodiment of the Coriolis measuring means of flow meter 10, the net instantaneous mass flow rate through conduits 14 and 14' or cummulative net flow rate therethrough over any given period may be readily determined.

Figure 7:
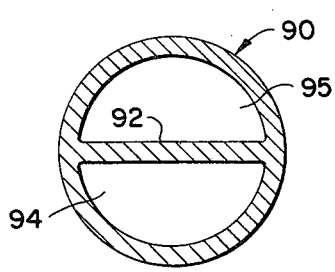
FIG. 7 is a cross sectional view of another conduit member having multiple channels defined therethrough.
Figure 8:
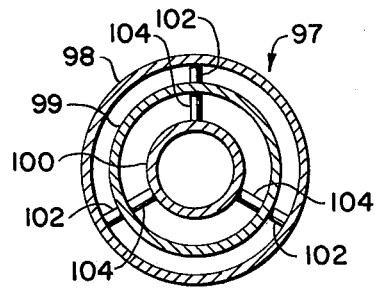
FIG. 8 is a cross sectional view of still another conduit member having multiple channels defined therethrough.

While multiple channels are preferably provided by multiple independant conduits such as conduits 14 and 14', it is to be understood that such channels may be provided by other configurations such as those illustrated in FIGS. 7 and 8. As shown in FIG. 7, conduit 90, which includes therein a barrier wall 92 defining individual channels 94 and 95. Thus flow through channels 94 and 95 are, for purposes of mass flow measurement, essentially equivalent to flow through conduits 14 and 14'. Distortion measuring means would be as discussed above, and conduit 90 would in essence constitute a single member equivalent to one of conduits 14 and 14' with appropriate oscillating and measuring means carried thereon in the general fashion illustrated in FIG. 1.

Conduit 97 of FIG. 8 is essentially the functional equivalent of the other multi-channel conduits except that the channels are defined coaxially. Outer wall 98, intermediate wall 99 and inner wall 100 define three coaxial channels therebetween. Walls 98, 99 and 100 may be held in place, for instance, by spacers 102 and 104, which form a support means which does not substantially restrict bending of conduit 97 in the beam and torsional modes. Other various arrangements of multiple channels will be apparent to those skilled in the art.

A flow meter substantially as illustrated in FIG. 1 was arranged with flow through one channel in a first direction being connected in series to the other channel such that flow was in the opposite direction. A source of fluid flow was connected and a calibration meter, which was substantially the flow meter of FIG. 1 having but a single channel, was provided in the flow circuit. The following measurements were obtained:

| Calibration Meter | Differential Meter |
|---|---|
| Indicated Flowrate in Pounds per Minute | Indicated Flowrate in Pounds per Minute |
| 0.00 | 0.00 |
| 0.46 | 0.00 |
| 0.66 | 0.00 |
| 0.87 | +0.00 |
| 0.96 | +0.01 |
| 1.45 | 0.00 |
| 1.87 | +0.01 |
| 2.04 | 0.00 |
| 2.58 | −0.01 |
| 3.00 | 0.00 |
| 3.18 | 0.00 |

It will be noted that the differential meter reading was substantially zero over varying flow rates. An important advantage of the arrangement thus is the generation of ratio or pure number between the two flow rates in which variations the electronic calibration will cancel. When two independant flow meters are utilized, the calibration factor is not identical and will not cancel to unity in most instances.

Various other mass flow measurement considerations not directly involved in the instant invention may be employed with the instant invention. For instance, the oscillating conduits of FIG. 1 will induce a vibration in support 12. If support 12 is affixed to sufficient mass, this is little problem. However, if desired, a spring arm member (not shown) having substantially the resonant frequency of the conduit members may be cantilevered from support 12 and carry there, for instance, the sensor coil and force coil. Such spring arm would then oscillate 180° out of phase with the conduit unit and substantially null the input forces into support 12.

In summary, the instant invention involves a relatively simple concept in which conventional mass flow meters utilizing Coriolis forces, either of simple or intricate design, may be configured with multiple flow channels therethrough. Differences, or sums, of flow rates of separate flow streams may be determined by flowing each stream through a distinct channel. More accurate measurements of areated or compressible materials of a common flow may be determined by passing the common stream through multiple channels thereby more closely comprising the material. In a preferred embodiment, the flow channels are physically distinct but form a unit which may be rotated or oscillated as required by the particular mass flow concept involved.

Although only a limited discussion of the preferred embodiment of the invention appears and has been illustrated, it is anticipated that numerous changes and modifications will be apparent to those skilled in the art with the benefit of the above disclosure, and that such changes may be made without departing from the scope of the invention as defined by the following claims.

What is claimed is:

1. In a Coriolis force type flow meter including a conduit unit measuring section for flow therethrough, means for moving the conduit unit through at least a portion of a rotary path, and means for measuring the Coriolis force resulting from flow of a material through the rotating conduit unit, the improvement comprising a plurality of channels defined through the conduit unit, the channels being isolated from one another throughout the conduit, and adapted to receive a plurality of isolated flowstreams and maintain the isolation thereof through the measuring section of the conduit unit, whereby a plurality of independent flow paths through the conduit unit may be maintained in additive or subtractive fashion and the flowstreams isolated prior to and during flow through the flowmeter.

2. A Coriolis force flow meter as set forth in claim 1 in which the conduit unit comprises at least one "U" shaped conduit supported in a cantilevered fashion, and the Coriolis force measuring means comprises means to determine the force tending to distort the "U" shaped conduit around an axis substantially parallel to and substantially equidistantly spaced from the side legs of the "U" shaped conduit.

3. A Coriolis force flow meter as set forth in claim 2 in which the conduit unit comprises a pair of spaced, substantially identical "U" shaped conduits each mounted in cantilevered fashion and connected together by wire members attached between the "U" shaped conduit and held in tension by the "U" shaped conduits.

4. A Coriolis force flow meter as set forth in claim 2 in which the conduit unit comprises a single "U" shaped conduit defining a plurality of isolated flow channels.

5. A Coriolis force flow meter as set forth in claim 4 in which the "U" shaped conduit is divided into isolated channels over its length by at least one wall member extending from wall to wall at the interior of the "U" shaped conduit.

6. A Coriolis force flow meter as set forth in claim 4 in which the "U" shaped conduit is divided into a plurality of flow channels by a plurality of coaxial tube members forming the "U" shaped conduit, and in which the coaxial tube members are constrained to bend in beam and torsion as a unit.

7. In a Coriolis type flow meter including at least one "U" shaped continuous conduit unit measuring section mounted at the open end of the "U" to a support and extending therefrom in a nonarticulated, cantilevered fashion, means for oscillating the conduit unit relative to the support on either side of the static plane of the "U" shaped conduit unit and about a first oscillation axis; and means to measure the Coriolis forces tending to elastically distort the "U" shaped conduit unit about a second deflective axis positioned substantially equidistant between the side legs of the "U" shaped conduit unit and through the oscillation axis thereof; the improvement comprising a plurality of isolated channels defined by at least one "U" shaped conduit unit, the isolated channels being adapted to receive a plurality of isolated material streams and maintain the isolation of the material streams through the measuring section of the conduit unit, whereby the sum of individual material flow through each channel may be measured as net flow while isolating the flowstreams prior to and during flow through the flowmeter.

8. A Coriolis force flow meter as set forth in claim 7 in which a plurality of spaced, substantially parallel "U" shaped conduits are connected to oscillate and tend to distort as a unit.

9. A Coriolis force flow meter as set forth in claim 8 in which two "U" shaped conduits are operable connected by wire connectors symmetrically positioned with the wire connectors being maintained in tension by "U" shaped tubes.

10. A Coriolis force flow meter as set forth in claim 7 in which the conduit unit comprises a single "U" shaped conduit defining multiple mutually isolated and independent channels therethrough.

11. A Coriolis force flow meter as set forth in claim 10 in which the multiple channels are defined by at least one wall member extending between interior walls of the conduit.

12. A Coriolis force flow meter as set forth in claim 10 in which the multiple channels are defined by coaxial tubes forming the "U" shaped conduit and maintained in a spaced relationship by radial spacers positioned between the tubes.

13. A method for measuring material flow comprising:
flowing at last two materials streams isolated prior to flow measurement through a conduit unit having a plurality of distinct and isolated flow channels extending therethrough with each material stream being confined to a distinct and isolated flow channel prior to and during flow measurement;
moving the conduit unit through at least a portion of a rotary path; and
measuring the net Coriolis forces imposed upon the conduit unit as a result of isolated flow of individual material streams therethrough.

14. A method of measuring material flow as set forth in claim 13 in which a plurality of distinct materials are flowed through the conduit unit with each material flow being confined to a single of the multiple channels.

15. A method of measuring material flow as set forth in claim 13 in which at least one stream of material is flowed in an opposite direction through one channel to that of another stream of material in another channel of the conduit unit, whereby the flow of such material flowing in the opposite direction will be subtracted from the net flow measured.

16. A method for measuring material flow as set forth in claim 13 in which the conduit unit is in the shape of at least one "U" shaped conduit mounted in a cantilevered fashion and the net Coriolis force is measured by measuring the net forces tending to deform the conduit unit around an axis of symmetry substantially perpendicular to the oscillation axis of the conduit unit.

17. A method for measuring material flow as set forth in claim 16 in which the forces tending to deform the conduit unit are measured by elastically deforming the conduit units along the length thereof and around the axis of symmetry substantially perpendicular to the oscillation axis of the conduit unit; and measuring the angle of deflection of the conduit unit around the axis of symmetry.

18. A method for measuring material flow as set forth in claim 17 in which the angle of deflection is determined by measuring the time differential between passage of one portion of the conduit unit through a plane substantially at the midpoint of the oscillation and the passage of a second portion of the conduit unit through such plane.

19. A method for measuring material flow as set forth in claim 16 wherein the conduit unit is comprised of a pair of "U" shaped conduits mounted in spaced but substantially parallel relationship and connected to oscillate and deflect as a single unit.

20. A method for measuring material flow as set forth in claim 19 in which the conduits are connected by wire connectors maintained in tension by the conduits.

21. A method for measuring material flow as set forth in claim 16 in which conduit units comprise a "U" shaped conduit having at least one divider member extending between the interior walls of the conduit to define isolated multiple flow paths therethrough.

22. A method for measuring material flow as set forth in claim 16 in which the "U" shaped conduit is formed of a plurality of coaxial tubes defining multiple flow channels therebetween, and adapted to oscillate as a single unit.

* * * * *